United States Patent
Goren et al.

(10) Patent No.: US 7,437,127 B2
(45) Date of Patent: Oct. 14, 2008

(54) METHOD AND SYSTEM FOR DETERMINING EXISTENCE OF A PREDETERMINED WIRELESS NETWORK COVERAGE CONDITION IN A WIRELESS NETWORK

(75) Inventors: David P. Goren, Smithtown, NY (US); Vinh-Phuong Tra Le, Fremont, CA (US); Benjamin Bekritsky, Hollis, NY (US); Guang Zeng, Selden, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 510 days.

(21) Appl. No.: 11/191,854

(22) Filed: Jul. 28, 2005

(65) Prior Publication Data

US 2007/0025287 A1 Feb. 1, 2007

(51) Int. Cl.
*H04B 7/00* (2006.01)
(52) U.S. Cl. .................. 455/67.11; 455/445; 455/456.1; 455/456.2
(58) Field of Classification Search ............... 455/67.11, 455/445, 456.1, 456.2; 370/328
See application file for complete search history.

(56) References Cited

U.S. PATENT DOCUMENTS

| | | | |
|---|---|---|---|
| 5,862,477 A | 1/1999 | Wellard et al. | |
| 6,317,599 B1 | 11/2001 | Rappaport et al. | |
| 6,442,507 B1 | 8/2002 | Skidmore et al. | |
| 6,493,679 B1 | 12/2002 | Rappaport et al. | |
| 6,499,006 B1 | 12/2002 | Rappaport et al. | |
| 6,625,454 B1 | 9/2003 | Rappaport et al. | |
| 6,721,769 B1 | 4/2004 | Rappaport et al. | |
| 6,850,946 B1 | 2/2005 | Rappaport et al. | |
| 6,876,951 B2 | 4/2005 | Skidmore et al. | |
| 7,116,988 B2 * | 10/2006 | Dietrich et al. | 455/456.1 |
| 2002/0006799 A1 | 1/2002 | Rappaport et al. | |
| 2002/0077787 A1 | 6/2002 | Rappaport et al. | |
| 2003/0014233 A1 | 1/2003 | Rappaport et al. | |
| 2003/0023412 A1 | 1/2003 | Rappaport et al. | |
| 2003/0050878 A1 | 3/2003 | Rappaport et al. | |
| 2003/0055604 A1 | 3/2003 | Skidmore et al. | |
| 2003/0229478 A1 | 12/2003 | Rappaport et al. | |
| 2004/0038683 A1 | 2/2004 | Rappaport et al. | |
| 2004/0133415 A1 | 7/2004 | Rappaport et al. | |

(Continued)

FOREIGN PATENT DOCUMENTS

AU 2001 291 148 A2 4/2002

(Continued)

*Primary Examiner*—William D Cumming
(74) *Attorney, Agent, or Firm*—Fay Kaplun & Marcin, LLP

(57) ABSTRACT

A wireless coverage map of a wireless network is generated as a function of a location of at least one access point and a first signal data collected at a plurality of locations within the network. The first signal data includes a first signal strength of a wireless signal communicated between the at least one access point and a wireless device. A second signal data is received. The second signal data includes a second signal strength of a further wireless signal communicated between one of the at least one access point and a further wireless device. The existence of the predetermined wireless network coverage condition is determined as a function of the second signal data and the wireless coverage map.

21 Claims, 4 Drawing Sheets

U.S. PATENT DOCUMENTS

| | | |
|---|---|---|
| 2004/0143428 A1 | 7/2004 | Rappaport et al. |
| 2004/0162840 A1 | 8/2004 | Rappaport et al. |
| 2004/0177085 A1 | 9/2004 | Rappaport et al. |
| 2004/0181374 A1 | 9/2004 | Rappaport et al. |
| 2004/0186847 A1 | 9/2004 | Rappaport et al. |
| 2004/0229623 A1 | 11/2004 | Rappaport et al. |
| 2004/0236547 A1 | 11/2004 | Rappaport et al. |
| 2004/0259554 A1 | 12/2004 | Rappaport et al. |
| 2004/0259555 A1 | 12/2004 | Rappaport et al. |
| 2005/0042999 A1 | 2/2005 | Rappaport et al. |
| 2005/0043933 A1 | 2/2005 | Rappaport et al. |
| 2005/0113120 A1 | 5/2005 | Rappaport et al. |
| 2005/0131619 A1 | 6/2005 | Rappaport et al. |
| 2005/0261004 A1* | 11/2005 | Dietrich et al. ........... 455/456.2 |
| 2006/0270412 A1* | 11/2006 | Willins et al. ................ 455/445 |
| 2007/0025287 A1* | 2/2007 | Goren et al. ................. 370/328 |
| 2007/0042716 A1* | 2/2007 | Goodall et al. ........... 455/67.11 |
| 2007/0082677 A1* | 4/2007 | Hart et al. ................. 455/456.1 |

FOREIGN PATENT DOCUMENTS

| | | |
|---|---|---|
| EP | 1 063 819 | 12/2000 |
| WO | 2005/125039 | 12/2005 |

* cited by examiner

US 7,437,127 B2

METHOD AND SYSTEM FOR DETERMINING EXISTENCE OF A PREDETERMINED WIRELESS NETWORK COVERAGE CONDITION IN A WIRELESS NETWORK

BACKGROUND INFORMATION

Wireless networks generally include one or more access points ("APs") wirelessly connected to one or more mobile units ("MUs") using radio frequency ("RF") signals. Wireless networks are frequency utilized in physical landscapes in which changes thereto may cause an RF coverage to be weakened or completely lost. For example, adding, removing and/or rearranging items within the landscape may result in a weaker signal strength between the APs and MUs or a coverage gap in the RF coverage. The RF signals may also be affected by other RF signals from adjacent or nearby wireless devices (e.g., MUs, APs, wireless switches, etc.).

To overcome these conditions and provide resilient RF coverage, network administrators typically deploy more APs than are necessary throughout the landscape to obtain the necessary RF coverage. Thus, at any given point within the landscape, the MU may connect to the network through a plurality of APs. Because the connection between the MU and the network is maintained between the MU and at least one AP, the administrator may not be made aware of a problematic condition with the APs which the MU is not associated with. The problematic condition may be, for example, a malfunctioning AP and/or a characteristic of the landscape (e.g., items blocking RF signals to/from AP). Thus, there is a need for identification of the problematic condition(s) in the wireless network.

SUMMARY OF THE INVENTION

The present invention is related to a method for determining an existence of a predetermined wireless network coverage condition. A wireless coverage map of a wireless network is generated as a function of a location of at least one access point and a first signal data collected at a plurality of locations within the network. The first signal data includes a first signal strength of a wireless signal communicated between the at least one access point and a wireless device. A second signal data is received. The second signal data includes a second signal strength of a further wireless signal communicated between one of the at least one access point and a further wireless device. The existence of the predetermined wireless network coverage condition is determined as a function of the second signal data and the wireless coverage map.

DETAILED DESCRIPTION

Figure 1:
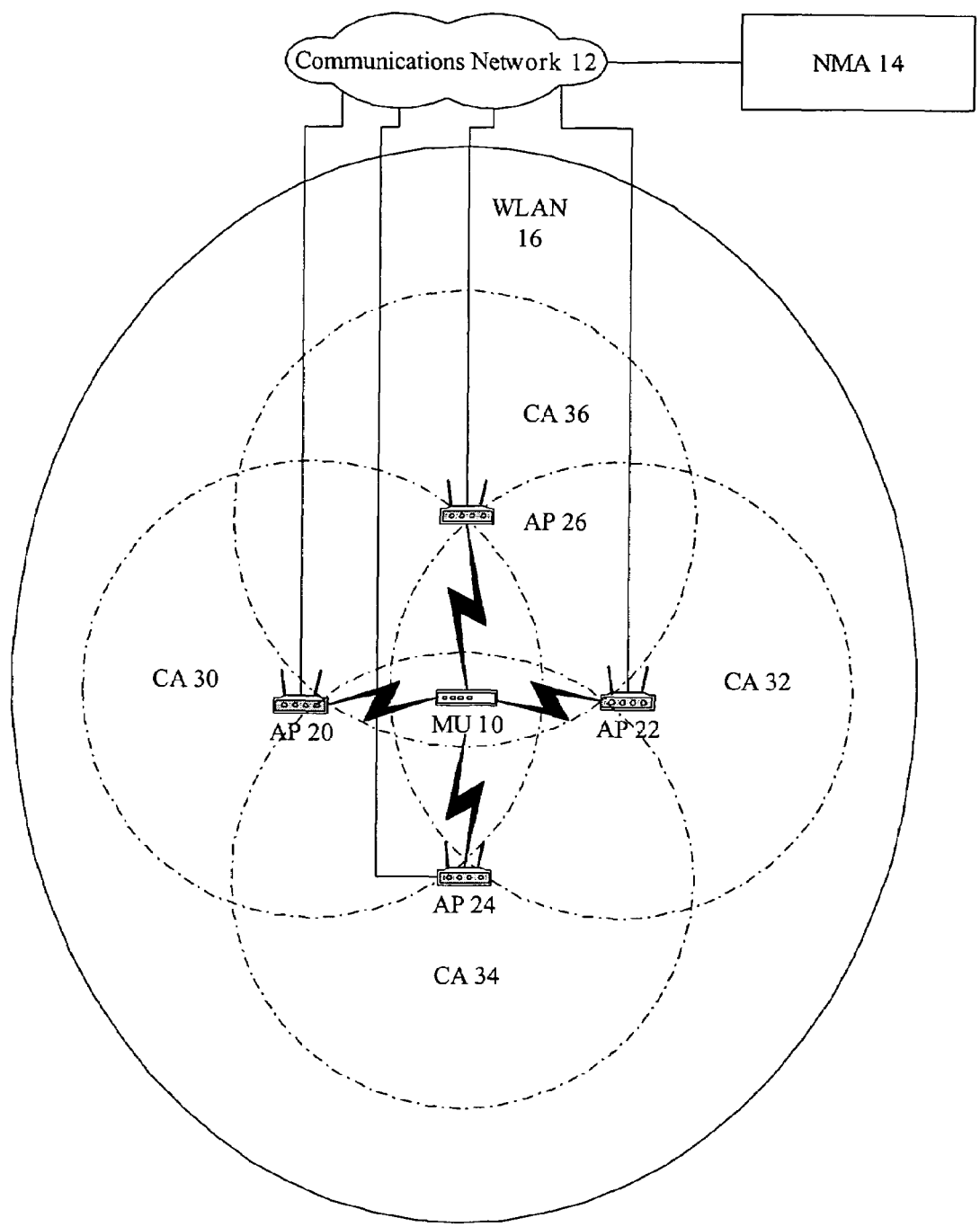
FIG. 1 is an exemplary embodiment of a system according to the present invention.

The present invention may be further understood with reference to the following description and the appended drawings, wherein like elements are provided with the same reference numerals. The present invention provides a system and a method for identification of a problematic condition(s) in a wireless network (e.g., WLAN). An exemplary embodiment of the present invention will be described in the context of an enclosed space (e.g., a store, a warehouse, etc.). However, one skilled in the art will understand that the present invention is not limited to such a space, but may be utilized in any environment which employs the wireless network.

FIG. 1 shows an exemplary embodiment of a system 1 according to the present invention. The system 1 may include a network management arrangement ("NMA") 14 coupled to a communications network 12. The NMA 14 may include one or more computing devices (e.g., a server, database, router, etc.) for sending and receiving a data request and may be responsible for managing the network 12. The NMA 14 may further include a storage medium (e.g., a memory) or be coupled to a stand-alone storage device (e.g., a database). In another embodiment, the NMA 14 may be a centralized NMA having a broader scope. For example, the NMA 14 may manage the networks of a plurality of locations (e.g., stores) from a central location (e.g., a headquarters). In the exemplary embodiment, the NMA 14 may be responsible for managing the network 12 and any devices coupled thereto. For example, the NMA 14 may store data about the network 12 including an operational status, an RF coverage area, a MAC address and a physical location of each wireless device connected to the network 12. This data may be utilized to facilitate management and operation of the network 12.

The network 12 may be any communications network comprising one or more infrastructure components (e.g., hubs, switches, servers, etc.) which interconnect the NMA 14 and devices in a WLAN 16. The network 12 may allow one or more WLANs to access the NMA 14. As shown in FIG. 1, the WLAN 16 may include one or more access points ("APs") 20,22,24,26 which provide a wireless connection for one or more mobile units ("MUs") 10 to the network 12. Those skilled in the art will understand that the WLAN 16 may include any number of APs and MUs. The APs 20-26 may be any wireless infrastructure device (e.g., wireless hub, router, switch, etc.) which provides wireless access to the network 12 for the MUs 10. Each MU 10 may be any mobile computing unit, such as, for example, an image- or laser-based scanner, an RFID reader, a cell phone, a laptop, a network interface card, a handheld computer, a PDA, etc. In a preferred embodiment, each MU 10 includes an RF communications arrangement (e.g., a transceiver) allowing it to wirelessly communicate with the APs 20-26 according to a predetermined wireless communications protocol (e.g., an IEEE 802.11 protocol). In this manner, the MU 10 may transmit/receive RF signals to/from the APs 20-26, thereby allowing the MU 10 to access the NMA 14 and other devices coupled to the network 12.

Each AP 20-26 may have a corresponding coverage area ("CA") which defines a region in which RF signals may be transmitted and received thereby. For example, the AP 20 may have a CA 30. As shown in FIG. 1, when the MU 10 is within the CA 30, it may communicate with the AP 20. Also shown in FIG. 1, the MU 10 is also within the CAs 30,32,34,36 of the APs 20-26. Thus, any RF signal transmitted by the MU 10 may be received by each of the APs, regardless of which AP is associated with the MU 10. Similarly, the MU 10 may receive signals (e.g., beacons) from each of the APs 20-26.

In the exemplary embodiment of the present invention, the NMA 14 may store data regarding operation of the WLAN 16 and the devices therein. For example, the NMA 14 may include information regarding a physical layout (e.g., a physical map) of the store. That is, when the devices of the WLAN 16 (e.g., APs 20-26) are being deployed, a location of each of the devices may be stored and compiled to form the physical map of the WLAN 16. Thus, the physical map may include the location (e.g., X-Y coordinates) of each AP deployed within the space. As will be described below, the physical map may be utilized in conjunction with coverage information (e.g., X-Y coordinates of the CAs 30-36) during operation of the WLAN 16 to determine, for example, locations of MUs and operational statuses of the devices of the WLAN 16. As understood by those of skill in the art, the physical map and operational statuses may be modified as a result of, for example, deployment of an additional AP, removal/powering down of an AP, etc.

Figure 2:
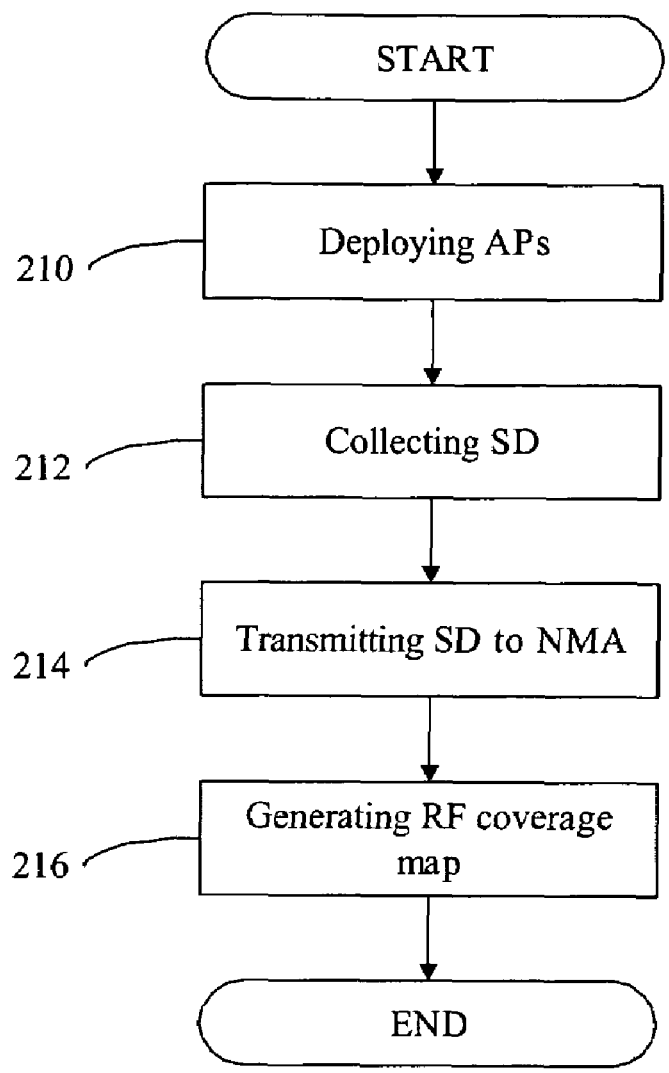
FIG. 2 is an exemplary embodiment of a method according to the present invention.

FIG. 2 shows an exemplary embodiment of a method 200 for generating an RF coverage map ("CM") of the WLAN 16 according to the present invention. In step 210, the APs 20-26 are deployed within a space (e.g., a store, a warehouse, etc.). Each AP may be disposed in a unique location with a goal of providing resilient RF coverage to MUs operating within the space. That is, the locations of the APs 20-26 may be determined based on a size and shape of the space and objects therein, and operational parameters of the APs (e.g., the CA, power levels, RF channel, etc.). During the deployment, the location of each AP may be input into the NMA 14 to create the physical map. For example, each location may be input as an X coordinate and a Y coordinate for a two-dimensional physical map, and an additional Z coordinate for a three-dimensional physical map. The radius of the CAs 30-36 may also be inputted and may be determined from, for example, predetermined values (e.g., a transmission range) corresponding to the APs 20-26. Thus, the physical map may be updated accordingly as each AP is deployed.

In step 212, signal data ("SD") (e.g., a received signal strength indicator, a signal-to-noise ratio, an RF channel delay spread, etc.) is collected by the APs 20-26 and/or the MU 10 at various positions within the WLAN 16. In one embodiment, the SD is initially collected when the space is empty or substantially empty (e.g., no products, shelves, etc. therein). The SD may also include information allowing for an identification of the MU 10 and/or the APs 20-26, such as the MAC addresses thereof. The SD may further include a timestamp (e.g., a date, a time of day, a transmission time, etc.). The SD may be collected after deployment of the APs 20-26, when a network administrator or user walks through the space transmitting signals to the APs 20-26 from the MU 10, or vice-versa. When the signals are transmitted, the MU 10 may not be performing its intended function (e.g., scanning), but simply transmitting signals allowing the APs 20-26 to collect the SD. In another embodiment, the MU 10 may collect the SD in response to signals (e.g., a beacon) from the APs 20-26. In this manner, the MU 10 may either transmit all the collected SD to the NMA 14 through a single AP (e.g., AP 20) or transmit each collected SD through a corresponding AP. For example, if the SD was collected from a signal transmitted by the AP 20, the SD would then be transmitted to the NMA 14 through the AP 20. The signal transmission from the MU 10 and/or the APs 20-26 may be automatic (e.g., at predetermined time intervals) or manual (e.g., user-initiated at different locations).

In step 214, the SD is transmitted to the NMA 14 via the network 12. Prior to transmission, collection of the SD may be terminated. Termination of the collection process may be automatic (e.g., immediately after receiving the SD) or manual (e.g., collection continues until the user terminates the transmission of signals from the MU 10 and/or the APS 20-26). Once the process is terminated, the SD is transmitted to the NMA 14.

In step 216, the NMA 14 generates the CM of the WLAN 16. In one embodiment, the CM is generated by superimposing the SD onto the physical map. Thus, the CM depicts the SD for corresponding locations within the WLAN 16. For example, in FIG. 1, the location of the MU 10 may be determined as a function of the SD collected by the MU 10 and/or one or more of the APs 20-26. As understood by those of skill in the art, a coarse location of the MU 10 may be obtained utilizing the SD from one or two APs, whereas a fine location may be obtained (e.g., triangulated) utilizing the SD from three or more APs.

Figure 3:
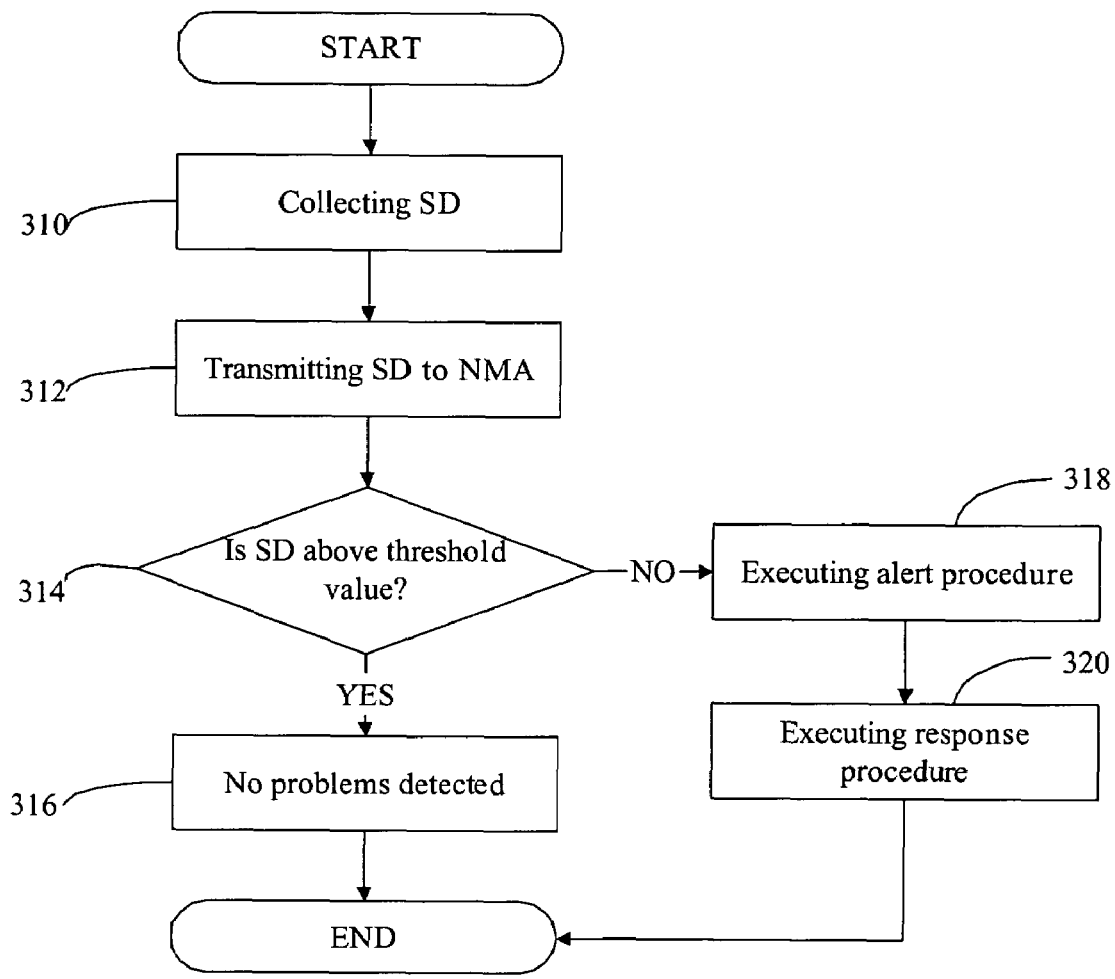
FIG. 3 is an exemplary embodiment of a further method according to the present invention.

FIG. 3 shows an exemplary embodiment of a method 300 for determining an existence of a predetermined wireless network coverage condition (e.g., a problematic condition) in the WLAN 16 according to the present invention. The problematic condition may be a result of a modification to the physical landscape (e.g., stacking items) which blocks or weakens RF signals. The problematic condition may also arise when one or more components of the WLAN 16 malfunction or are nonoperational. For example, if the AP 20 is damaged or turned off, the AP 20 may not collect SD and SD may not be collected therefrom. However, even when the AP 20 is malfunctioning, the MU 10 may still receive an RF signal therefrom.

In step 310, the SD is collected by the MU 10 and/or any AP capable of receiving a signal from the MU 10 (e.g., APs 20-26). For example, as shown in FIG. 1, the MU 10 may potentially collect the SD from each of the APs 20-26, because the MU 10 is within the CAs 30-36. Similarly, each of the APs 20-26 may potentially collect the SD from the MU 10. Those of skill in the art will understand that the SD may be compiled from a predetermined number and/or a predetermined time of communication between the MU 10 and the APs. Further, the MU 10 and/or the APs may perform a predetermined operation (e.g., averaging, statistical variance, etc.) on the communications to compute the SD.

In step 312, the SD is transmitted to the NMA 14 through the network 12. In one embodiment, the SD transmission may be automatic (e.g., immediately after the SD is collected). In another embodiment, transmission may be manual (e.g., the user directs the MU 10 to transmit the SD, the user instructs the NMA 14 to collect the SD from the APs 20-26 and/or the MU 10). The NMA 14 may store the SD in the database. In other embodiments, the NMA 14 may temporarily store the SD (e.g., the SD is stored in a cache).

In step 314, the NMA 14 compares the received SD to a threshold value to determine whether the problematic condition(s) exists. For example, if the problematic condition exists (e.g., the signals from the MU 10 to the AP 20 are weak/blocked), the AP associated with the problematic condition may create a SD different from the threshold value and/or the SD collected in step 212 of the method 200. As understood by those skilled in the art, when collecting the SD in step 212, the SD may be compared to the threshold value then to determine whether the problematic condition exists during set-up of the WLAN 16.

The threshold value may be a minimum value at which the AP can transmit and/or receive signals successfully. For example, in one embodiment, if the SD is the received signal strength, the threshold value may be a minimum value for which the NMA 14 recognizes that the corresponding AP is operational. If the threshold value is fixed, the NMA 14 may immediately determine if any of the received SDs are below the fixed threshold value. In another embodiment, if the SD is the received signal strength, the threshold value may be a maximum allowable difference between a stored received signal strength and the presently received signal strength.

Those of skill in the art would understand that the fixed value and the allowable difference may be utilized together.

In step 316, each of the received SDs is above the threshold value, indicating that the problematic condition was not identified. Thus, no problems were detected within the WLAN 16.

In step 318, the NMA 14 executes an alert procedure, because the SD was below the threshold value and/or exceeded the allowable difference (e.g., the problematic condition was identified). A network administrator may be alerted by, for example, outputting an alert message to a server. The user may be alerted by, for example, transmitting the alert message to the MU 10. That is, the MU 10 may still communicate with the NMA 14 (e.g., through the non-problematic APs) even though the problematic condition exists. The alert may be graphical (e.g., displaying the physical map and marking the location(s) of the MU 10 and any affected APS, etc.), text-based (e.g, displaying the coordinates of the location(s) of the MU 10 and the affected APs), or a combination thereof. The alert may also include a time at which the problematic condition was identified, a list of possible causes of the problematic condition, and a list of remedies that the administrator or user may attempt (e.g., diagnostic testing of the AP, checking for physical obstructions at the location(s), etc.).

The alert may allow the administrator/user to determine when, where, and with respect to which devices the problematic condition is identified. For example, if the problematic condition exists with respect to the AP 20, the NMA 14 may record a location of the MU 10 at a time when the problematic condition is detected. The administrator may run a diagnostic test on the AP 20 to determine if there is a hardware/software malfunction. If the diagnostic test does not return any errors, the administrator may examine the physical landscape around the recorded location and the AP 20. For example, the administrator may notice that items had been stacked around a portion of the AP 20, blocking RF signals between the AP 20 and the recorded location. After the items are removed, the administrator may utilized a further MU to retest the AP 20.

In step 320, the NMA 14 may execute a response procedure attempting to remedy either permanently or temporarily the problematic condition. In one embodiment, the response procedure includes an instruction to boost a power which is transmitted to one or more of the non-problematic APs communicating with or in a communicable range of the MU 10. For example, the NMA 14 may boost the power of the APs 22-26 so that the CAs 32-36 are increased to maintain the connection with the MU 10 and/or cover all or part of the CA 30. Thus, the RF coverage may remain unaffected until the administrator or user can permanently resolve the problematic condition.

In another embodiment, the NMA 14 may not boost the power of the APs 22-26 immediately upon detection of the problematic condition. For example, the NMA 14 may store a history of locations for the MU 10 and predict a direction of movement for the MU 10 based upon the history of locations. When the direction of movement indicates that the MU 10 is moving towards the AP 20 or further away from the non-problematic APs, the alert may be issued and the power of the APs 22-26 boosted. In this embodiment, the NMA 14 may track the MU 10, and, in anticipation of moving towards the AP 20 or further away from the non-problematic APs 22-26, the NMA 14 may instruct one or more of the non-problematic APs 22-26 to boost its respective powers.

Figure 4:
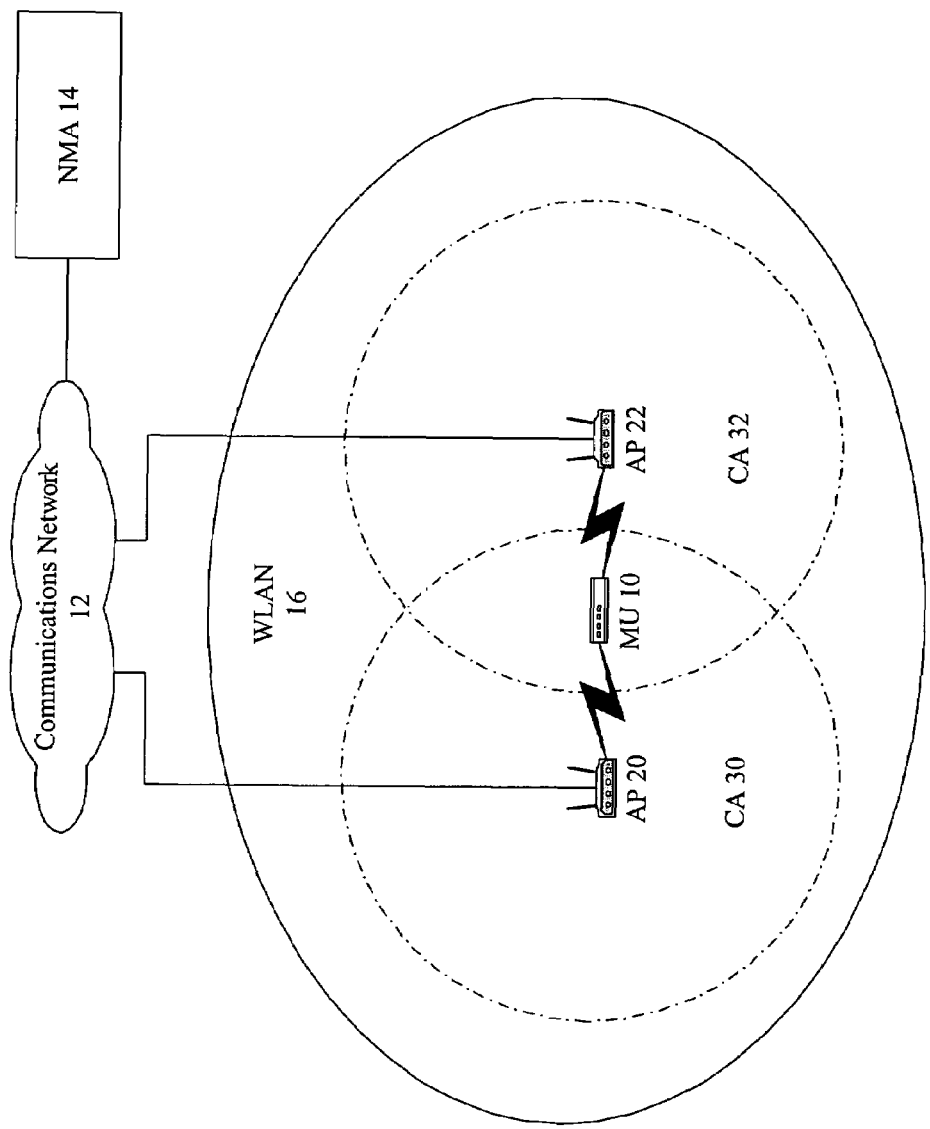
FIG. 4 is an exemplary embodiment of a further system according to the present invention.

FIG. 4 shows an exemplary embodiment of a system 2 according to the present invention. The system 2 may include substantially similar components to those of the system 1, including the network 12, the NMA 14, the WLAN 16, the MU 10, the APs 20,22 and the CAs 30,32. Thus, the system 2 may only include two APs, or only the APs 20,22 may be in communication with the MU 10. Therefore, the location of the MU 10 may not be determined as precisely as with the system 1, because at least three APs are necessary for determining the fine location (e.g., triangulation) thereof. For example, an overlapping area of the CAs in the location of the MU 10 may be larger in size than in the system 1. That is, if the problematic condition is detected with respect to the AP 20, the NMA 14 may only determine that the MU 10 is located somewhere within an overlapping area of the CAs 30,32. In contrast, when the problematic condition is identified with respect to the AP 20 in the system 1, the location of the MU 10 may be determined to be within an overlapping area of the CAs 30-36, which is substantially smaller in size.

Those skilled in the art will understand that in alternative embodiments, the number of APs may be varied to suit the user's needs. For example, if the user only needs to identify the existence and not the location of the problematic condition, the user may deploy the APs such that each monitored location in the WLAN 16 is covered by two APs. Thus, when the MU 10 encounters the problematic condition with respect to one AP, the NMA 14 may still receive SD from a second AP and identify the existence of the problematic condition. Alternatively, if the user desires to determine an exact location of the problematic condition, three or more APs may be deployed at each monitored location. By utilizing existing devices in the WLAN 16, the present invention enables problematic conditions to be identified while minimizing costs associated with deploying hardware to monitor the network. The present invention also allows users to choose a degree of monitoring which is scalable with an increased need for resilient RF coverage and identification of problems with a network infrastructure.

The present invention has been described with the reference to the above exemplary embodiments. One skilled in the art would understand that the present invention may also be successfully implemented if modified. Accordingly, various modifications and changes may be made to the embodiments without departing from the broadest spirit and scope of the present invention as set forth in the claims that follow. The specification and drawings, accordingly, should be regarded in an illustrative rather than restrictive sense.

What is claimed is:

1. A method, comprising:
   generating a wireless coverage map of a wireless network as a function of a location of at least one access point and a first signal data collected at a plurality of locations within the network, the first signal data including a first signal strength of a first wireless signal communicated between the at least one access point and a first wireless device;
   receiving a second signal data, the second signal data including a second signal strength of a second wireless signal communicated between one of the at least one access point and a second wireless device; and
   determining an existence of a predetermined wireless network coverage condition as a function of the second signal data, a first location of the one of the at least one access point, a second location of the second wireless device and the wireless coverage map.

2. The method according to claim 1, wherein the first signal data further includes at least one of(i) a first signal-to-noise ratio of the first wireless signal and (ii) a first channel delay spread, and the second signal data includes at least one of(i) a second signal-to-noise ratio of the second wireless signal and (ii) a second channel delay spread.

3. The method according to claim 1, wherein the generating step includes the following substeps:
  generating a physical map of the network, the physical map including the location of the at least one access point; and
  superimposing the first signal data on the physical map.

4. The method according to claim 1, wherein the wireless coverage map includes at least one of (i) an identifier of each of the at least one access point and (ii) data indicative of an operational status of the at least one access point.

5. The method according to claim 4, wherein the identifier is a MAC address.

6. The method according to claim 1, wherein the second wireless device includes at least one of an image-based scanner, a laser-based scanner and a RFID reader.

7. The method according to claim 1, further comprising:
  receiving a third signal data, the third signal data including a third signal strength of a third wireless signal communicated between a further one of the at least one access point and the second wireless device; and
  determining the existence of the predetermined wireless network coverage condition as the function of the second signal data, the third signal data and the wireless coverage map.

8. The method according to claim 1, wherein the predetermined wireless network coverage condition is one of (i) a malfunctioning access point and (ii) a change of a physical landscape within a predetermined range of the second wireless device.

9. The method according to claim 1, wherein the determining step includes the following substeps:
  comparing the second signal data to a predetermined threshold value; and
  when the second signal data is less than the predetermined threshold value, executing a predetermined action.

10. The method according to claim 9, wherein the threshold value is one of (i) a minimum signal strength at which the at least one access point communicates with the second wireless device and (ii) a maximum allowable difference between the first signal data and the second signal data.

11. The method according to claim 9, wherein the predetermined action is a message to at least one of (i) a server coupled to the wireless network and (ii) the second wireless device.

12. The method according to claim 11, wherein the message includes a first location of the second wireless device and a second location of the at least one access point.

13. The method according to claim 1, further comprising:
  identifying a problematic access point of the at least one access point which is associated with the predetermined wireless network coverage condition; and
  boosting a power level of at least one non-problematic access point of the at least one access point within a predetermined range of the problematic access point.

14. A system, comprising:
  a network management arrangement ("NMA");
  at least one access point coupled to the NMA;
  a first wireless device communicating with the at least one access point utilizing a first wireless signal,
  wherein, the NMA generates a wireless coverage map of a wireless networks a function of a location of the at least one access point and a first signal data collected at a plurality of locations within the network, the first signal data including a first signal strength of a second wireless signal communicated between the at least one access point and a second wireless device,
  wherein, the NMA receives a second signal data, the second signal data including a second signal strength of the first wireless signal communicated between one of the at least one access point and the first wireless device, and
  wherein, the NMA determines an existence of a predetermined wireless network coverage condition as a function of the second signal data, a first location of the one of the at least one access point, a second location of the first wireless device and the wireless coverage map.

15. The system according to claim 14, wherein the NMA generates a physical map of the network, the physical map including the location of the at least one access point, and the NMA superimposes the first signal data on the physical map to generate the coverage map.

16. The system according to claim 14, wherein the first wireless device includes at least one of an image-based scanner, a laser-based scanner and a RFID reader.

17. The system according to claim 14, wherein the predetermined wireless network coverage condition is one of (i) a malfunctioning access point of the at least one access point and (ii) a change of a physical landscape within a predetermined range of the first wireless device.

18. The system according to claim 14, wherein the NMA compares the second signal data to a predetermined threshold value, and, when the second signal data is less than the predetermined threshold value, the NMA executes a predetermined action.

19. The method according to claim 18, wherein the threshold value is one of (i) a minimum signal strength at which the at least one access point may communicate with the first wireless device and (ii) a maximum allowable difference between the first signal data and the second signal data.

20. An arrangement, comprising:
  a processor;
  a memory; and
  a communication arrangement coupling to at least one access point,
  wherein, the processor generates a wireless coverage map of a wireless network as a function of a location of the at least one access point and a first signal data collected at a plurality of locations within the network, the first signal data including a first signal strength of a first wireless signal communicated between the at least one access point and a first wireless device,
  wherein, the processor receives a second signal data, the second signal data including a second signal strength of a second wireless signal communicated between one of the at least one access point and a second wireless device, and
  wherein, the processor determines an existence of a predetermined wireless network coverage condition as a function of the second signal data, a first location of the one of the at least one access point, a second location of the second wireless device and the wireless coverage map.

21. The arrangement according to claim 20, wherein the arrangement is one of a switch and a router.

* * * * *

UNITED STATES PATENT AND TRADEMARK OFFICE
CERTIFICATE OF CORRECTION

| | | |
|---|---|---|
| PATENT NO. | : 7,437,127 B2 | Page 1 of 1 |
| APPLICATION NO. | : 11/191854 | |
| DATED | : October 14, 2008 | |
| INVENTOR(S) | : Goren et al. | |

It is certified that error appears in the above-identified patent and that said Letters Patent is hereby corrected as shown below:

In Column 6, Line 63, in Claim 2, delete "of(i)" and insert -- of (i) --, therefor.

In Column 6, Line 65, in Claim 2, delete "of(i)" and insert -- of (i) --, therefor.

In Column 7, Line 26, in Claim 8, delete "of(i)" and insert -- of (i) --, therefor.

In Column 7, Line 61, in Claim 14, delete "networks a" and insert -- network as --, therefor.

Signed and Sealed this

Twenty-fourth Day of August, 2010

David J. Kappos
*Director of the United States Patent and Trademark Office*